United States Patent [19]

Cook

[11] 3,911,434
[45] Oct. 7, 1975

[54] DATA TRANSMISSION SYSTEM EMPLOYING A HARMONIC TRANSPONDER INCLUDING MEANS FOR VARYING PHASE IN RESPONSE TO SURROUNDING CONDITIONS

[75] Inventor: Edward J. Cook, South Hamilton, Mass.

[73] Assignee: Tele-Sensors, Inc., Boston, Mass.

[22] Filed: Feb. 12, 1973

[21] Appl. No.: 331,837

[52] U.S. Cl. ............................... 343/6.5 R; 340/58
[51] Int. Cl.² ........................................... G01S 9/58
[58] Field of Search ....... 343/6.5 R, 6.5 CC, 6.5 SS, 343/6.8 R, 6.8 LC; 340/58; 73/146.5

[56] References Cited
UNITED STATES PATENTS

| | | | |
|---|---|---|---|
| 2,274,557 | 2/1942 | Morgan et al. | 340/58 UX |
| 2,910,683 | 10/1959 | Todd | 343/6.8 R |
| 3,218,638 | 11/1965 | Honig | 343/6.5 R |
| 3,229,684 | 1/1966 | Nagumo et al. | 343/6.5 R |
| 3,427,613 | 2/1969 | Kawaraha et al. | 343/6.5 SS |
| 3,631,484 | 12/1971 | Augenblick | 343/6.5 R |
| 3,659,292 | 4/1972 | Low et al. | 343/6.5 R |
| 3,694,803 | 9/1972 | Strenglein | 340/58 |
| 3,754,250 | 8/1973 | Bruner | 343/6.5 CC |
| 3,806,905 | 4/1974 | Strenglein | 340/58 X |

OTHER PUBLICATIONS

H. J. Reich et al., *Theory & Application of Active Devices*, D. Van Nostrand Co., 1966, pp. 658–670.

Primary Examiner—Maynard R. Wilbur
Assistant Examiner—G. E. Montone
Attorney, Agent, or Firm—Morse, Altman, Oates & Bello

[57] ABSTRACT

A telemetry system is provided wherein a passive transponder, requiring no internal power source, may be located remotely from a transmitter and receiving station and return information with respect to a remote condition. A central station transmits a signal to the transponder, which includes a transducer such as a pressure or temperature responsive device adapted to electronically alter the transmitted signal at the transducer by generating a harmonic of the carrier and varying the phase of the harmonic. The original signal is thus encoded at the transducer and is reflected back to the receiver where the signals are processed to separate and display the encoded data. The system may be used on vehicles to monitor tire pressure.

10 Claims, 6 Drawing Figures

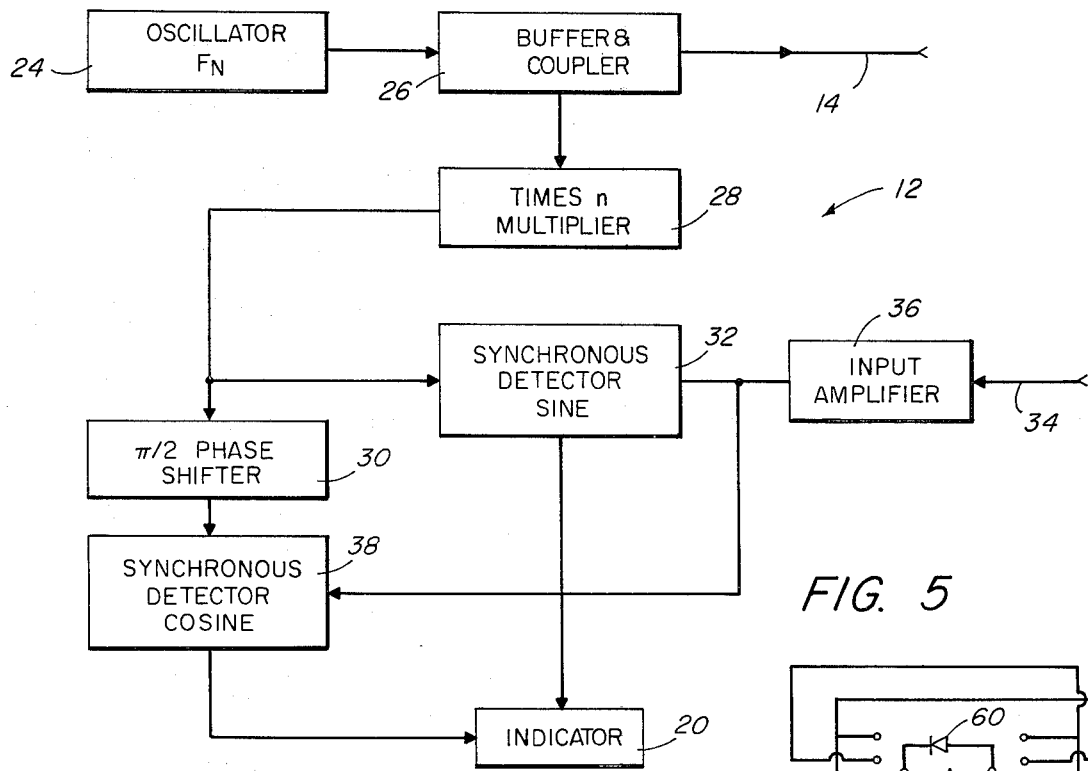
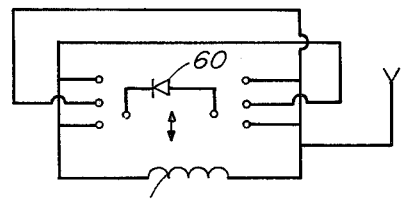
FIG. 5
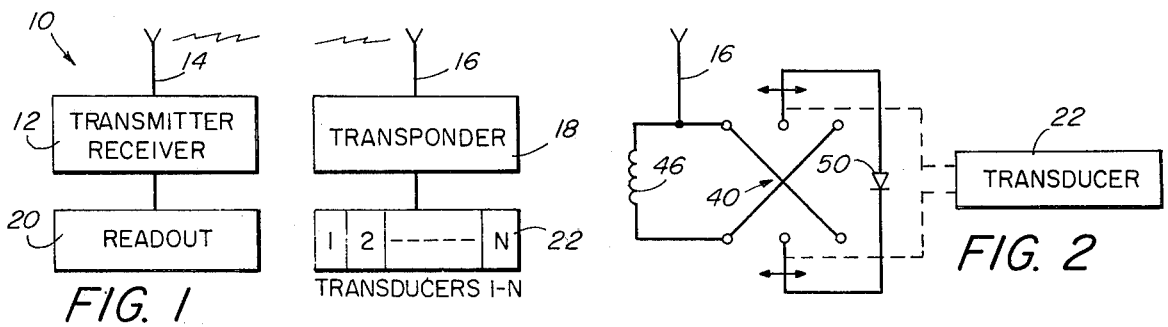
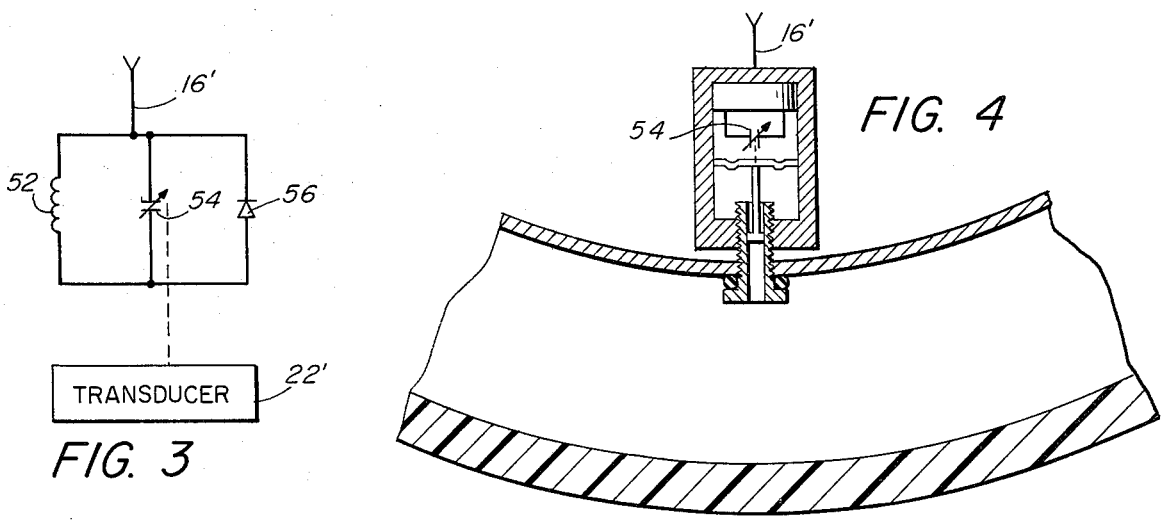

DATA TRANSMISSION SYSTEM EMPLOYING A HARMONIC TRANSPONDER INCLUDING MEANS FOR VARYING PHASE IN RESPONSE TO SURROUNDING CONDITIONS

CROSS-REFERENCE TO RELATED APPLICATION

This application discloses improvements on my application Ser. No. 214,623, filed Jan. 3, 1972 and entitled "Data Transmission System With Passive Transponder."

BACKGROUND OF THE INVENTION

1. Field of the Invention

This invention relates generally to telemetry systems and more particularly is directed towards a data transmission system employing remotely located passive transponders requiring no internal power sources.

2. Description of the Prior Art

Telemetry involves the transmission of information from some remote sensing apparatus to a central station. Telemetry systems are widely used for various applications where information is desired with respect to some remote location. For certain applications, telemetry transmitters have been employed which are responsive to commands sent from a central station. Such remote transmitters are normally referred to as transponders and contain, in addition to a transmitter, a small receiver for accepting incoming command signals from the central station.

A major limitation on the unattended life of all telemetry equipment has been the availability of electrical power needed to energize the transmission and receiving units. Typically, a battery is employed to operate the remote transponder although for some sophisticated applications solar or nuclear power is employed. Where a very small power transmitter is involved, only the conventional chemical battery is practical and the operational period must be measured in days or weeks before replacement of the battery becomes necessary. These power requirements sharply limit the utility, effectiveness and applications of telemetry equipment.

In my co-pending application Ser. No. 214,623, filed Jan. 3, 1972 and entitled Data Transmission System With Passive Transponder, there is disclosed a telemetry system wherein the remote transponder functions without any local power source. It is an object of this invention to provide improvements in the above system and particularly with respect to the passive transponder.

SUMMARY OF THE INVENTION

This invention features a data transmission system, comprising a transmitter adapted to generate and transmit a radio signal to a transponder remotely located from the transmitter and having no power source other than that contained in the transmitted signal. The transponder is responsive to a monitored condition such as pressure, temperature, or the like, and is adapted to encode information on the transmitted signal by phase shifting a harmonic of the signal and reflecting the encoded signal to a receiver which may be located at the transmitter station and combined with the transmitter. The receiver is adapted to process the encoded signal to obtain data therefrom with respect to the condition monitored by the transponder.

BRIEF DESCRIPTION OF THE DRAWINGS

FIG. 1 is a block diagram of a data transmission system made according to the invention, FIG. 2 is a circuit diagram of a passive transponder employed in the FIG. 1 system, FIG. 3 is a circuit diagram showing a modified passive transponder, FIG. 4 is a sectional view in side elevation, somewhat schematic, of a pressure transducer for use with a passive transponder, FIG. 5 is a block diagram of a modified transmitter-receiver station, and FIG. 6 is a circuit diagram of another modified transponder.

DETAILED DESCRIPTION OF THE PREFERRED EMBODIMENTS

Referring now to the drawings and to FIG. 1 in particular, there will first be given a general description of the system to be followed by a specific description and variations thereof. In FIG. 1, a central station 10 is equipped with a transmitting and receiving unit 12, wherein the transmitter portion is adapted to generate N signals, typically in the form of pure sine wave RF carriers, which are transmitted from an antenna 14 and picked up by an antenna 16 for a passive transponder unit, generally indicated by the referernce character 18, typically located remotely from the central station 10. The transponder unit 18 is passive in the sense that it requires no internal power source but rather simply impresses information electronically on the transmitted signals and reflects them back from the antenna 16 to the receiver antenna at the central station. The receiving portion of the unit 12 electronically processes the returned signals to separate the impressed information from the carrier signals which may then be used to operate a suitable output device 20 such as a display, alarm, or the like.

The transponder unit 18 includes N sensors 22, typically transducers which respond to local conditions such as pressure or temperature, and these, in turn, are coupled to the transponder circuitry in such a fashion to shift the phase of the corresponding signal from the transmitter. The signals are thus encoded by the transponder and reflected back to the receiver. Insofar as no internal power source is required, the transponder has an indefinite functional life and is not dependent upon batteries, sunlight or any other of the usual power sources normally employed in telemetry systems. Further, the passive nature of the transponder insures that there will be no useless radiation from the transponder during those periods when the central station is not actively seeking information.

Referring now more particularly to FIG. 5, there is illustrated in block diagram a transceiver 12 made according to the invention wherein the advantages of synchronous detection are utilized in the transmission, reception and decoding of the signals to and from the transponder 18. The technique has the advantage of employing an extremely small effective bandwidth around the carrier as set by the frequency response of a synchronous detector which is usually determined by a low pass filter following the detector.

In FIG. 5, a circuit is provided for the synchronous detection of a harmonic of the carrier signals which are pure sine waves. In the FIG. 5 circuit there is no modulation of the N discrete carrier frequencies, and each frequency is processed through a set of operations illustrated in the block diagram of the various components making up a central station 10. The system includes an oscillator 24 adapted to generate a plurality of time multiplexed signals having frequencies $f_1$ through $f_N$ which signals are passed into a buffer and a coupler 26 which is operatively connected to the transmitting antenna 14. The buffer and coupler unit 26 also provides an output to a times $n$ frequency multiplier 28 feeding into both a $\pi/2$ phase shifter 30 and a synchronous detector (sine) 32. The encoded signals $nf_1$ through $nf_N$ returning from the transponder 18 are picked up by a receiving antenna 34, amplified at 36 with the amplified signals fed into the synchronous detector (sine) 32 as well as into a synchronous detector (cosine) 38 which is also receiving an input from the phase shifter 30. The outputs of both synchronous detectors 32 and 38 are fed into the readout indicator 20.

With the foregoing system, the input amplifier 36 is common to all frequencies and the signal separation of $nf_1$ through $nf_N$ is done by the synchronous detectors 32 and 38. A significant feature of this circuit is the absence of tuned filters. The multiplication factor $n$ of multiplier 28 determines which harmonic produced in the transponder 18 will be utilized. In most applications, the second harmonic will be employed and for multiplier 28, $n$ will be set $n = 2$.

The multiplicity of signals $f_1$ through $f_N$ will be required only if the tranponder 18 is encoding information from N independent transducers. In many applications, the transponder will incorporate only one transducer and only one carrier frequency will be provided by the transmitting portion of unit 12.

Referring now to FIG. 2 of the drawings there is illustrated a transponder circuit which may be used in conjunction with the transducer 22. The transponder of FIG. 2 includes an inductance 46, the antenna 16, a 2 pole, three position switch 48 and a diode 50. The switch poles are operatively connected to the transducer 22 so as to be moved by the transducer to any one of three positions. The transducer 22 may be any one of a variety of devices having a motion output in response to a monitored condition. In the preferred embodiment for monitoring tire pressure the transducer may include a small cylinder mounted to the valve stem of a tire and having a piston the position of which changes with the tire pressure. This piston may be coupled to the poles. The action of the switch is to either connect the diode 50 across the coil 46 in one of two polarities or to leave it unconnected. When the diode is connected across the coil, the diode rectifies the signal received from the central station 10 and produces a strong second harmonic current flow in the coil 46. The phase of this second harmonic current depends on the polarity of the diode 50, and a 180° phase shift accompanies reversal of the diode. In the central or null position, the diode 50 is not connected to the coil and no second harmonic current flows. Such a transponder is ideally suited to the tire pressure monitoring application since it makes three codes available, namely, (1) a − phase second harmonic for low pressure, (2) no second harmonic for the proper pressure, and (3) a + phase second harmonic for high pressure.

Referring now to FIG. 3 of the drawings, there is illustrated a modification of the transponder and in this embodiment a simple circuit provides for a continuous pressure readout. The transponder circuit in FIG. 3 includes an inductance 52, a capacitance 54 and a diode 56 connected in parallel to an antenna 16'. The inductance 52 and capacitor 54 are tuned to the fundamental with either of the inductance or capacitor made variable. For purposes of discussion, the capacitor 54 is made variable and is operated by means of the transducer 22' so as to respond to the pressure as suggested in FIG. 4. The phase of the fundamental voltage applied across the diode 56 is determined by the tuning of the inductance 52 and a capacitor 54 (a +90°to 0°to − 90°phase shift accompanies the tuning through the resonant frequency) and this, in turn, determines the phase of the second harmonic caused by the rectifying action of the diode. Hence, it is possible to correlate a continuous change in the second harmonic phase shift with a continuous change in pressure.

It will be noted that only one antenna is required for both the fundamental and harmonic signals. This feature provides a practical arrangement in applying this application to the design of the transponder unit in a tire pressure monitoring system.

In operation, the transmitter employs a pure sine wave carrier and the transponder utilizes a phase shift coding of a second harmonic signal. Since a reference coherency can be established only with the harmonics, they are essential to any system which utilizes the carrier in some way for synchronous detection. In the transponder disclosed herein, a passive, non-linear component is employed for generating a harmonic (or harmonics) of the transmitted carrier signal received from the central station. While the use of the second harmonic has been indicated, other harmonics may be employed if they can be generated in the transponder with good efficiency. Also, the transponder contains some means for varying the phase of the harmonic (or harmonics) employed so as to effect the desired information coding and transfer.

The foregoing transponder provides a very simple, efficient and effective means for acquiring information from the transducer. It is particularly useful as a tire pressure monitoring device since the circuitry is kept to an absolute minimum yet is able to provide, in one mode, information with respect to high pressure, low pressure and normal pressure in the tire and, in another mode, provides for a continuous pressure readout arrangement.

There are certain limitations inherent in the uses of phase shift coding in the transponder on the maximum electrical length between the transmitter and the transponder. This follows from the requirement that the propagation time phase shift of the transmited signal in its round trip between transmitter and receiver be small compared to the phase shift imposed by the transponder. In fact, any propagation time phase shift may be viewed as an error in the transponder coding.

As a consequence of the foregoing limitations, the separation between the transmitter's antenna and the transponder must be kept electrically short, i.e., a small fraction of an electrical wavelength. In antenna theory it is established that close to an antenna, the induction field prevails, while at a distance, the radiation field prevails, and at about one-sixth of a wavelength the two are equal. Since working distances are contemplated at far less than one-sixth of a wave length, the present phase shift coding system is primarily concerned with induction coupling between the transmitter and the transponder. Under these circumstances the name antenna may be somewhat of a misnomer in this case, since it is desirable to avoid a design which develops a radiation field which may conflict with FCC regulations.

Referring now to FIG. 6 of the drawings, there is illustrated a further modification of the invention, and, in this embodiment a diode 60 can be switched in different positions across a coil 62 in response to a transducer movement. In this configuration the + indication confirms normal pressure in a tire pressure monitoring system while the − indication is used for either high or low pressure conditions. Since a second harmonic signal is always transmitted, the system function is assured and therefore fail-safe. With this type of transponder the circuitry is quite simple and the receiver requirements are reduced.

Having thus described the invention what I claim and desire to obtain by Letters Patent of the United States is:

1. A data transmission system, comprising
   a. a transmitter adapted to generate and transmit an original radio frequency carrier signal in the form of a sine wave of a first frequency,
   b. a non-linear passive transponder remotely located from said transmitter for receiving said carrier signal, encoding information thereon and reflecting an encoded signal at a second frequency, and,
   c. a receiver located remotely from said transponder for receiving said encoded signal at said second frequency said receiver including synchronous detection circuit means for decoding said information from said encoded signal, the distance between said transponder and transmitter being less that the wavelength of said signal,
   d. said transponder including a transducer responsive to a physical condition,
   e. said transponder including signal encoding circuitry operatively connected to said transducer for altering said carrier signal in accordance with changes in said condition,
   f. said signal encoding circuitry including passive harmonic generating means including a rectifier adapted to generate at least one harmonic of said carrier signal and phase varying means responsive to said transducer for varying the phase of the harmonic,
   g. said transponder including an inductance and a double pole, three-position switch for connecting said rectifier to said inductance in one of two polar positions and for disconnecting said rectifier from said inductance and said transducer includes pressure responsive means operatively connected to said switch for selectively actuating said switch in response to said change.

2. A data transmitter according to claim 1 including means for generating and transmitting a plurality of discrete frequencies.

3. A data transmission system according to claim 1 wherein said transducer is pressure responsive.

4. A data transmission system according to claim 1 wherein said tranducer is temperature responsive.

5. A data transmission system according to claim 1 wherein said transducer includes a movable member responsive to changes in pressure.

6. A data transmission system according to claim 3 wherein said transponder is mounted to a pneumatic tire and is responsive to changes in tire pressure.

7. A data transmission system according to claim 1 wherein said transmitter is mounted to a vehicle equipped with wheelmounted pneumatic tires and at least one said transponder is mounted to at least one of said wheels and is responsive to changes in tire pressure.

8. A data transmission system, comprising
   a. a transmitter adapted to generate and transmit an original radio frequency carrier signal at a first frequency in the form of a sine wave of a predetermined wavelength,
   b. a non-linear passive transponder remotely located from said transmitter for receiving said carrier signal, encoding information thereon and reflecting an encoded signal at a second freqeuncy, and
   c. a receiver located remotely from said transponder for receiving said encoded signal at said second frequency, said receiver including synchronous detection circuit means for decoding said information from said encoded signal, the distance between said transponder and receiver being less than said wavelength,
   d. said transponder including a transducer responsive to a physical condition,
   e. said transponder including signal encoding circuitry operatively connected to said transducer for altering said carrier signal in accordance with changes in said condition,
   f. said signal encoding circuitry including passive harmonic generating means including a rectifier adapted to generate at least one harmonic of said carrier signal and phase varying means responsive to said transducer for varying the phase of the harmonic,
   g. said transponder including rectifying means, inductance means and capacitance means connected in parallel, at least one of said inductance and capacitance means being variable and said transducer including pressure responsive means connected to the variable means for selectively changing the variable means in response to changes in pressure.

9. A data transmission system according to claim 8 wherein said transmitter is mounted to a vehicle equipped with wheel-mounted pneumatic tires and at least one said transponder is mounted to at least one of said wheels in communication with the tire mounted thereon and responsive to changes in tire pressure.

10. A data transmission system for monitoring the pressure in pneumatic tires mounted on wheels of a vehicle, comprising
   a. a transmitter mounted in fixed position on said vehicle and adapted to generate and transmit an original radio frequency carrier signal of a predetermined frequency in the form of a sine wave,
   b. a passive transponder mounted to at least one wheel of said vehicle for receiving said carrier signal, encoding tire pressure information thereon and reflecting an encoded signal at a harmonic of said frequency, and,
   c. a receiver mounted in fixed position on said vehicle for receiving said encoded signal at said harmonic, said receiver including decoding circuit means for decoding said tire pressure information from said encoded signal, d. said transponder including a pressure transducer communicating with the interior of said tire and responsive to changes in tire pressure, e. said transponder including signal encoding circuitry operatively connected to said transducer for altering said carrier signal in accordance with changes in said condition, f. said signal encoding circuitry including passive harmonic generating means adapted to generate at least one harmonic of said carrier signal and phase varying means including variable non-linear rectifying means responsive to said transducer for varying the phase of the harmonic.

* * * * *